United States Patent
Rachow (10) Patent No.: US 10,780,449 B2
(45) Date of Patent: Sep. 22, 2020

(54) SPRAY ACCESSORY HAVING FILTER FOR VEHICLE WASHER SPRAY SYSTEM

(71) Applicant: A. Raymond et Cie, Grenoble (FR)

(72) Inventor: Larry Michael Rachow, Lenox, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 16/030,373

(22) Filed: Jul. 9, 2018

(65) Prior Publication Data
US 2020/0009596 A1 Jan. 9, 2020

(51) Int. Cl.
B05B 15/40 (2018.01)
B60S 1/46 (2006.01)
B60S 1/56 (2006.01)

(52) U.S. Cl.
CPC ............... B05B 15/40 (2018.02); B60S 1/46 (2013.01); B60S 1/56 (2013.01)

(58) Field of Classification Search
CPC ............... B05B 15/40; B60S 1/46; B60S 1/56
USPC ................. 210/459, 435, 439, 446, 117, 136
See application file for complete search history.

(56) References Cited

U.S. PATENT DOCUMENTS

| | | |
|---|---|---|
| 4,178,760 A | 12/1979 | Alf et al. |
| 4,502,953 A | 3/1985 | Marsh et al. |
| 5,411,123 A | 5/1995 | Rej et al. |
| 5,853,575 A | 12/1998 | Wydra et al. |
| 5,853,600 A * | 12/1998 | McNeal ................ B01L 3/5021 210/789 |
| 6,116,274 A * | 9/2000 | Ehrlich ............... F16K 37/0058 137/528 |
| 6,161,529 A | 12/2000 | Burgess |
| 6,904,929 B2 | 6/2005 | Ruschke |
| 7,214,311 B2 | 5/2007 | Aberle et al. |
| 7,419,591 B2 | 9/2008 | Aberle et al. |
| 8,127,790 B2 | 3/2012 | Van Weelden et al. |
| 9,421,354 B2 | 8/2016 | Carmody et al. |
| 2001/0040123 A1 | 11/2001 | Beckham |
| 2002/0195141 A1 | 12/2002 | Ruschke |
| 2004/0149649 A1 | 8/2004 | Uchiyama |
| 2004/0188541 A1 | 9/2004 | Maruyama |
| 2005/0258086 A1 | 11/2005 | Lin |

(Continued)

FOREIGN PATENT DOCUMENTS

| | | |
|---|---|---|
| DE | 102010004213 A1 | 7/2011 |
| FR | 2906004 A1 | 3/2008 |
| FR | 2906005 A1 | 3/2008 |

*Primary Examiner* — Madeline Gonzalez
(74) *Attorney, Agent, or Firm* — Warner Norcross + Judd LLP (57) ABSTRACT

The disclosed inventive concept provides a fluid accessory for facilitating the dispensing of fluid onto a vehicle's windshield, cameras, sensors, or the like. The fluid accessory includes a body having an inlet portion and an outlet portion in which an inlet adapter and an outlet adapter, respectively, are fitted. The fluid accessory also includes a sleeve which is fitted within the body and around the inlet adapter. The body includes a plurality of longitudinal protrusions extending radially into the body. The sleeve and longitudinal projections cooperate to define a plurality of debris collection channels for collecting debris flowing within the fluid and through the fluid accessory. The fluid accessory also includes a filter media, such as a filter media, which is positioned between the outlet adapter and the body.

20 Claims, 8 Drawing Sheets

(56) References Cited

U.S. PATENT DOCUMENTS

| | | |
|---|---|---|
| 2006/0201557 A1 | 9/2006 | Shieh |
| 2007/0209687 A1* | 9/2007 | Fistler .................... B01D 35/02 |
| | | 134/111 |
| 2008/0122901 A1 | 5/2008 | Platt et al. |
| 2008/0184971 A1 | 8/2008 | Lubinski et al. |
| 2009/0126708 A1 | 5/2009 | Jang |
| 2009/0151925 A1 | 6/2009 | Richards |
| 2013/0214007 A1 | 8/2013 | Simonian |
| 2015/0265948 A1 | 9/2015 | Ellison et al. |
| 2016/0290194 A1 | 10/2016 | Parikh et al. |
| 2017/0119205 A1 | 5/2017 | Powell et al. |
| 2017/0227136 A1 | 8/2017 | Workman |

* cited by examiner

SPRAY ACCESSORY HAVING FILTER FOR VEHICLE WASHER SPRAY SYSTEM

TECHNICAL FIELD

The disclosed inventive concept pertains to fluid spray systems. More particularly, the disclosed inventive concept concerns fluid spray accessories having a filter disposed therein to prevent debris from passing through. Even more particularly, the disclosed inventive concept pertains to fluid spray accessories that redirect debris into a debris collection channels.

BACKGROUND OF THE INVENTION

Washing nozzles are commonly used in vehicles for spraying a fluid on parts of the vehicle, such as the windshield, headlights, cameras, and sensors, in order to wash debris off its surface. These systems typically include a washer nozzle connected to a connection pipe, which draws fluid from a fluid reservoir or storage tank.

Typically, foreign objects or debris find its way into the reservoir either from being initially mixed in with the fluid and poured in or otherwise accumulating within the reservoir. Thus, when the fluid is drawn from the reservoir, the debris flows through the washer nozzle as well. This can cause damage to the surfaces onto which the washer fluid is sprayed. Additionally, it can cause damage to the internal components of the entire washing system of the vehicle, which can lead to costly repairs.

As a result, it is desired to provide means for preventing debris from flowing through the nozzle and being sprayed onto these surfaces. Therefore, the prior art has addressed this situation by proposing a number of solutions which include positioning a filter within the nozzle or an adapter located upstream up the nozzle and preventing debris from being sprayed out of the nozzle.

For example, U.S. Patent Application Publication Nos. 2004/0188541 to Maruyama and 2007/0209687 to Fistler disclose potential solutions to this problem. Each of the systems taught therein includes a spray nozzle apparatus including a filter disposed downstream of the fluid inlet and upstream of the fluid outlet. However, as the filter prevents debris from passing through the fluid outlet, the filter becomes clogged as there is no space for the debris to be diverted away from the filter. This reduces the rate of flow and performance of the fluid through the nozzle. As a result, at least the filter must be replaced over time in order to ensure that the nozzle remains operational.

Therefore, there is a need for a spray accessory within a spray system that can prevent debris from being sprayed onto a surface to be washed while avoiding the need to replace spray components after a relatively short period of time. Therefore, in view of the state of the art, it may be advantageous to provide a spray adapter that is capable of diverting debris away from a filter and storing the debris. As in so many areas of fluid spray components, there is always room for improvement related to spray accessories.

SUMMARY OF THE INVENTION

The disclosed inventive concept overcomes the problems associated with known spray nozzles and fluid accessories having a filter by providing means for diverting debris. The disclosed inventive concept offers the significant general advantage of extending the life of the components of a spray system by delaying the need to replace the nozzle, the accessory, or filter itself when the filter becomes clogged.

Particularly, the disclosed inventive concept provides a fluid accessory comprising a body having an open first end and an open second end. The body includes a plurality of longitudinal protrusions extending from an inner wall of the body. The protrusions are spaced apart from one another along the inner circumference of the body.

An inlet adapter is insertable into the first end of the body. The inlet adapter includes an inlet barb at a first end thereof for securing a first fluid pipe or conduit thereto. Fluid flows through the inlet adapter and exits an outlet port of the inlet adapter in a longitudinal direction. The inlet adapter may also include an optional cap at a second end thereof in order to direct the flow of fluid out of the outlet port of the inlet adapter in a perpendicular direction. The cap cooperates with an elastic and expandable sleeve fitted around the outlet port in order to form a check valve and maintain pressure within the inlet adapter when fluid is not flowing therethrough.

A plurality of channels is defined between adjacent protrusions and the inlet adapter. These channels provide debris collection channels for debris to collect as the system is cycled and debris settles therein. When the cap is utilized, the channels are defined between adjacent protrusions and the sleeve. It is to be understood that the purpose of the sleeve is to conceal the sides of the outlet port when the cap is not utilized. Therefore, the sleeve is not necessary when the cap is not employed and fluid is permitted to flow directly out of the outlet port in a linear manner.

The fluid accessory further includes a filter media positioned within the body and an outlet adapter insertable into the second end of the body, which secures the filter media in position. As a result, the filter media prevents debris or other foreign objects from passing through the body and out of the outlet adapter. Also, by diverting the debris away from the filter media, this allows for maintaining system performance because the debris does not accumulate on the filter media.

The outlet adapter has an outlet barb at a first end thereof for connecting to a second fluid pipe or conduit. In order to ensure a fluid tight seal between the outlet adapter and the body, a sealing member, such as an O-ring, encircles a lip at a second end of the outlet adapter and is positioned between the outlet adapter and the inner wall of the body.

As debris passes through the body, the filter media prevents the passage of debris therethrough. Instead, as the system is cycled, the debris is redirected backward, away from the filter media, and into any one of the plurality of channels due to the angular orientation of the fluid accessory and the effect of gravity. Debris is then collected within each of the channels until they are filled. Thereafter, the fluid accessory can be replaced with a new fluid accessory.

While the disclosed inventive concept does not eliminate the need to replace the fluid accessory, the lifespan of these types of components is increased by providing storage areas for debris to accumulate within. Without such channels, the filter media becomes clogged over time, which hinders the performance of the fluid accessory until it is rendered unusable or causes further damage to other components in the spray or fluid system.

The above advantages, in addition to other advantages and features, will be readily apparent from the following detailed description of the invention when taken in connection with the accompanying drawings.

BRIEF DESCRIPTION OF THE DRAWINGS

For a more complete understanding of this disclosed inventive concept, reference should now be made to the embodiments illustrated in greater detail in the accompanying drawings and described below by way of examples of the disclosed inventive concept wherein.

DETAILED DESCRIPTION OF THE INVENTION

In the following figures, the same reference numerals will be used to refer to the same components. In the following description, various operating parameters and components are described for different constructed embodiments. These specific parameters and components are included as examples and are not meant to be limiting.

Figure 1:
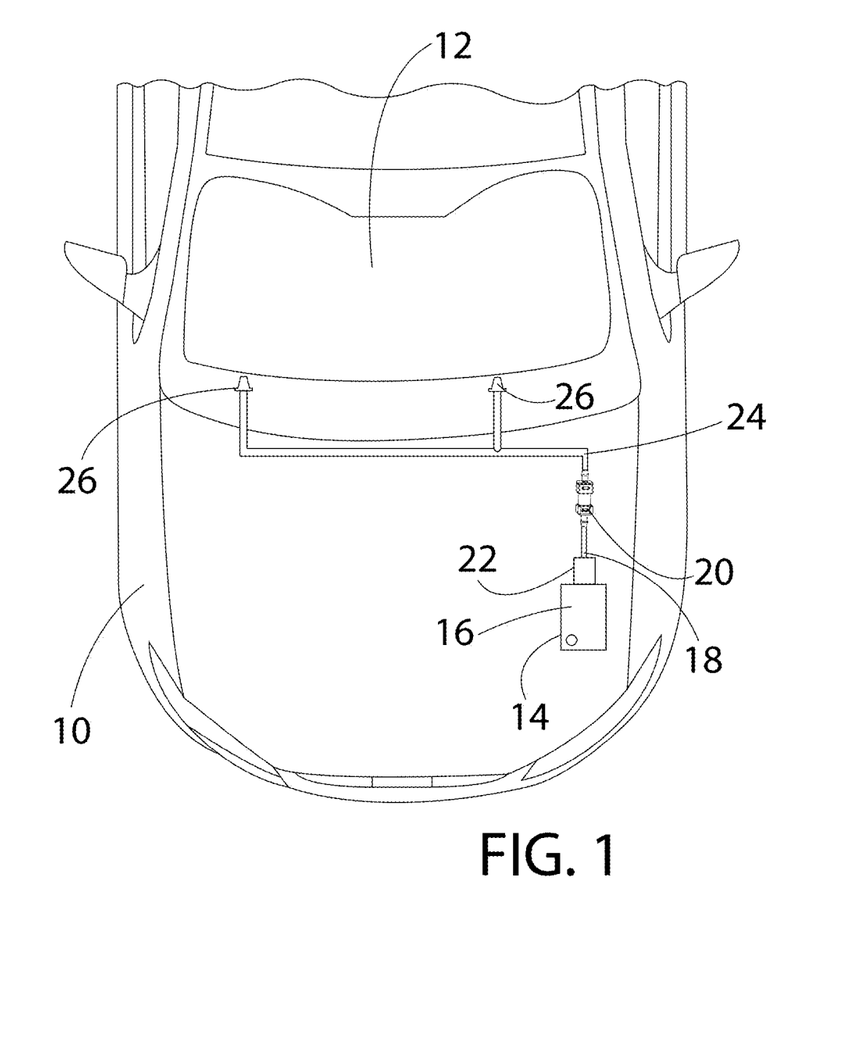
FIG. 1 is an environmental view of a fluid accessory in accordance with the disclosed inventive concept in use on a vehicle.

In accordance with the disclosed inventive concept and with reference to FIG. 1 of the drawings, there is provided a vehicle 10 including a fluid spray system comprising a fluid accessory 20 for facilitating fluid 16 being applied onto the windshield 12 of the vehicle 10. The vehicle 10 also includes a reservoir 14 for storing a supply of the fluid 16. The reservoir 14 includes a pump 22 which pressurizes the system to allow for fluid delivery to the windshield 12. A first fluid hose or conduit 18 interconnects the pump 22 to a first end of the fluid accessory 20. The pump 22 is activated to cause the fluid 16 to be drawn from the reservoir 14 and into the fluid accessory 20 via the first fluid hose 18. A second fluid hose or conduit 24 interconnects a second end of the fluid accessory 20 with at least one spray nozzle 26 located proximate the surface requiring fluid, such as the windshield 12. However, it is to be understood that the disclosed inventive concept may be similarly utilized for delivering fluid to a surface of any number of sensors or cameras on the vehicle 10.

Figure 2:
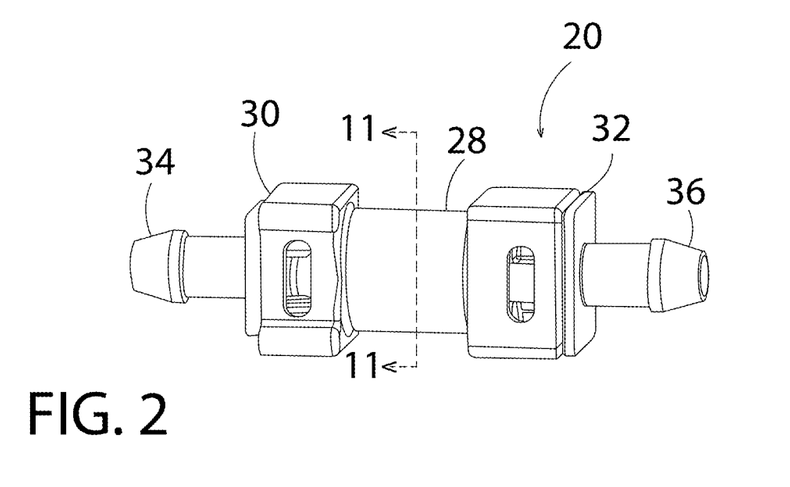
FIG. 2 is a perspective view of the fluid accessory in accordance with the disclosed inventive concept.

As shown in FIG. 2, the fluid accessory 20 generally comprises a body 28 having an inlet end 30 and an outlet end 32. An inlet adapter 34 is inserted into the inlet end 30 of the body 28 and an outlet adapter 36 is inserted into the outlet end 32 of the body 28. The first and second fluid hoses 18 and 24 are secured to the inlet adapter 34 and the outlet adapter 36, respectively. Thus, fluid 16 is able to flow from the reservoir 14 to the spray nozzle(s) 26 through the fluid accessory 20.

Figure 3:
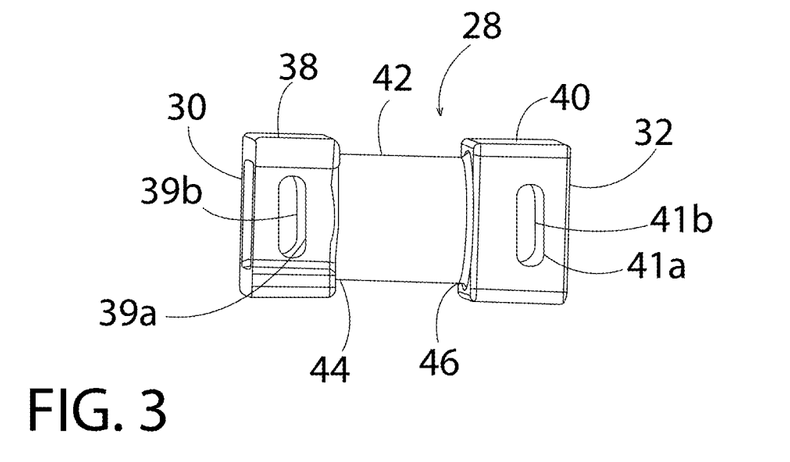
FIG. 3 is a perspective view of a body of the fluid accessory in accordance with the disclosed inventive concept.
Figure 4:
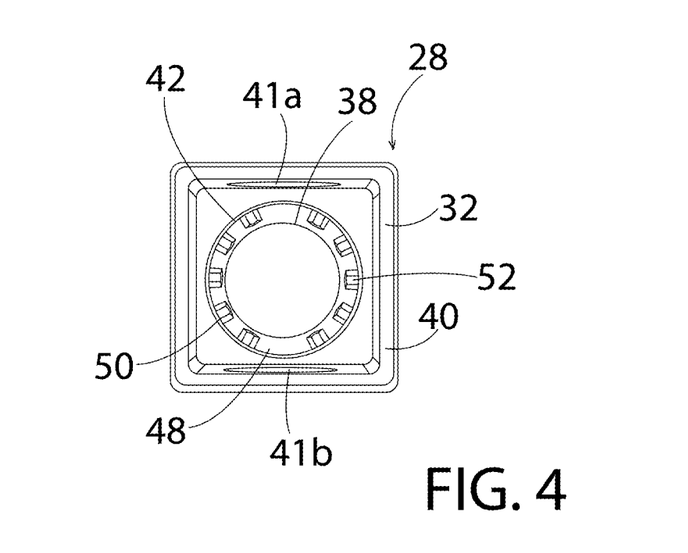
FIG. 4 is a front view of the body in accordance with the disclosed inventive concept.
Figure 5:
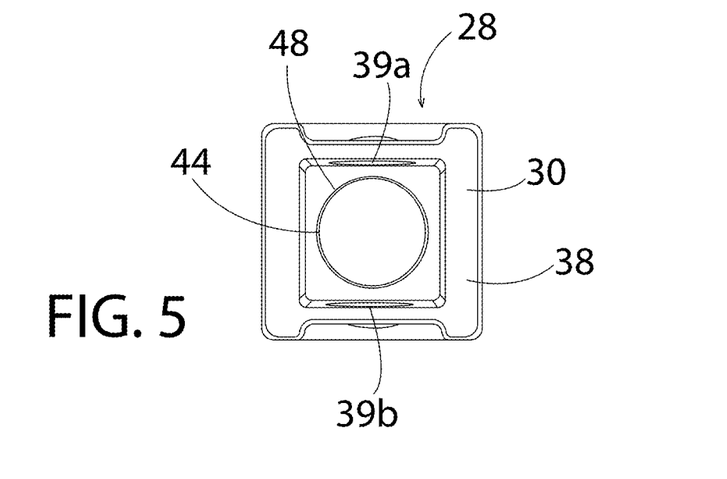
FIG. 5 is a rear view of the body in accordance with the disclosed inventive concept.

FIGS. 3-5 show the body 28 in isolation. As noted above, the body 28 has an inlet end 30 and an outlet end 32 in which the inlet adapter 34 and the outlet adapter 36, respectively, are fitted. Thus, the body 28 includes an inlet portion 38 in which the inlet adapter 34 is housed and an outlet portion 40 in which the outlet adapter 36 is housed. A pair of openings 39a and 39b is formed in opposite sides of the inlet portion 38 in order to receive inlet flanges 58 on the inlet adapter 34, discussed in more detail below. Similarly, a pair of openings 41a and 41b is also formed in opposite sides of the outlet portion 40 which receive outlet flanges 90 on the outlet adapter 36, discussed below. A tubular medial portion 42 interconnects the inlet portion 38 and the outlet portion 40. The medial portion 42 has a circular cross-section having a proximal end 44 proximate the inlet portion 38 and a distal end 46 proximate the outlet portion 40.

As shown in FIG. 4, as viewed from the outlet end 32 of the body 28, the medial portion 42 has an inner surface 50 from which a plurality of longitudinally protrusions 52 extend radially thereinto. The protrusions 52 are spaced apart from another and extend along the inner circumference of the medial portion 42. A section of the inlet portion 38 proximate the proximal end 44 of the medial portion 42 has an inner circular cross-section which is less than the circular cross-section of the medial portion 42. Thus, the inlet portion 38 forms a shoulder 48. The protrusions 52 extend radially into the medial portion 42, but less than the inner diameter of the shoulder 48. Thus, the protrusions 52 are not visible when viewing the body 28 from the inlet end 30 thereof, as illustrated in FIG. 5.

Figure 6:
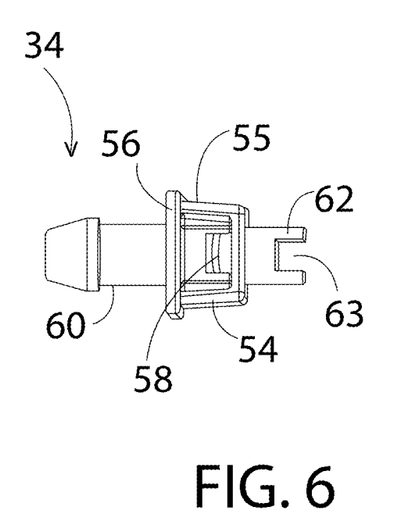
FIG. 6 is a side view of an inlet adapter in accordance with the disclosed inventive concept.
Figure 7:
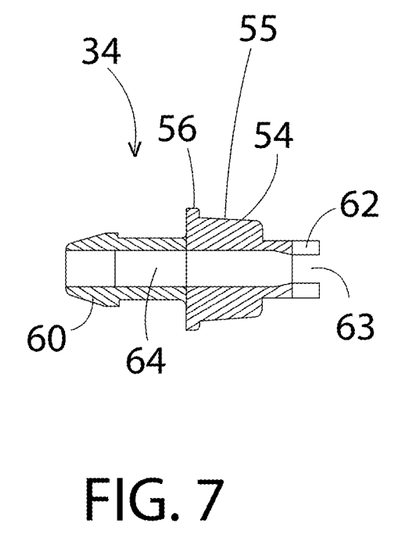
FIG. 7 is a cross-section view of the inlet adapter of FIG. 6.

FIGS. 6 and 7 show a side view and cross-section view, respectively, of the inlet adapter 34. The inlet adapter 34 includes an inlet frame 54 having inwardly-tapered edges 55 which fit within the inlet portion 38 of the body 28. It is to be understood that the inner walls of the inlet portion 38 are also tapered to accommodate the inlet frame 54. The inlet frame 54 also includes an inlet stop plate 56, which prevents the inlet frame 54 from extending too far into the body 28. Additionally, the inlet frame 54 includes a pair of inlet flanges 58 (only one is shown) protruding from opposite sides of the inlet frame 54. Each inlet flange 58 extends through a respective one of the openings 39a and 39b formed in the inlet portion 38 of the body 28, thereby locking the inlet adapter 34 within the inlet portion 38 when inserted therein.

An inlet barb 60 and a sleeve receiver 62 extend from the inlet frame 54 at opposite ends thereof. An inlet fluid passageway 64 is formed through the inlet barb 60, the inlet frame 54, and the sleeve receiver 62. Thus, once the inlet barb 60 is inserted into an end of the first fluid hose 18 (FIG. 1), fluid is permitted to flow through the inlet fluid passageway 64 of the inlet adapter 34, out of the inlet adapter 34 through an outlet port 63, and enter the body 28. Thus, fluid flows in a linear and longitudinal direction out through the outlet port 63 and into the body 28.

Figure 8:
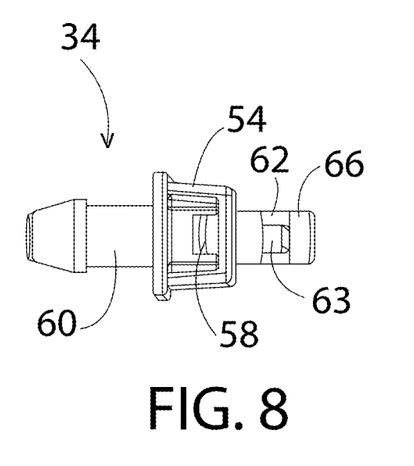
FIG. 8 is a side view of the inlet adapter of FIG. 6 having a cap for providing a check valve.
Figure 9:
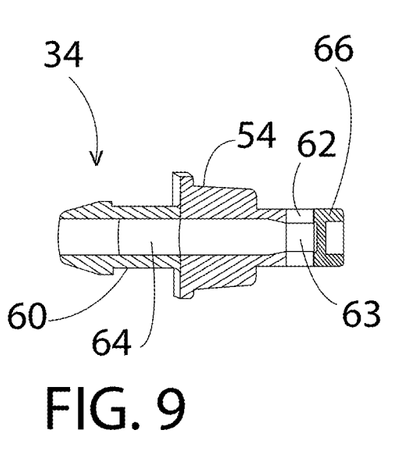
FIG. 9 is a cross-section view of the inlet adapter of FIG. 8.

Referring to FIGS. 8 and 9, the inlet adapter 34 is shown including a cap 66 attached to the sleeve receiver 62, proximate the outlet port 63, and opposite the inlet frame 54.

When the pump 22 is stopped, fluid 16 is no longer supplied to the fluid accessory 20. However, due to the configuration and relationship of the cap 66 and the sleeve 68, discussed below, fluid exits the outlet port 63 in a perpendicular manner.

Figure 10:
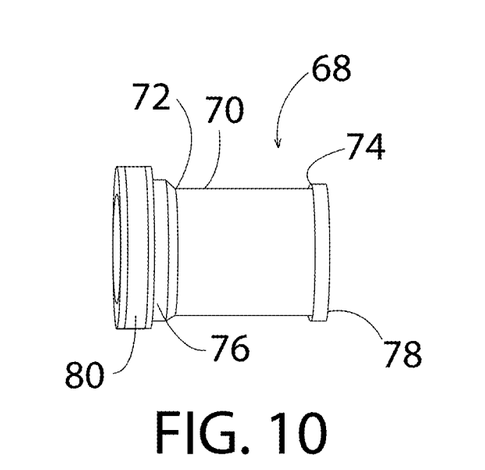
FIG. 10 is a perspective view of a sleeve in accordance with the disclosed inventive concept.

As shown in FIG. 10, the sleeve 68 is illustrated apart from the other components. The sleeve 68 is an elastic member, preferably formed from silicone, with the ability to swell and expand as fluid applies outward force from within. The sleeve 68 includes a hollow tubular member 70 having a first end 72 and a second end 74. The first end 72 includes a first lip 76 and the second end 74 includes a second lip 78. Preferably, the outer diameter of the first lip 76 is greater than the outer diameter of the second lip 78. A rim 80 is formed on a side of the first lip 76 opposite the tubular member 70. The rim 80 has an outer diameter larger than the outer diameter of the first lip 76 and the second lip 78. As discussed in more detail below, it is to be understood that the sleeve 68 and the cap 66 cooperate to provide a check valve. Thus, the sleeve 68 is not critical when the cap 66 is not utilized.

Figure 11:
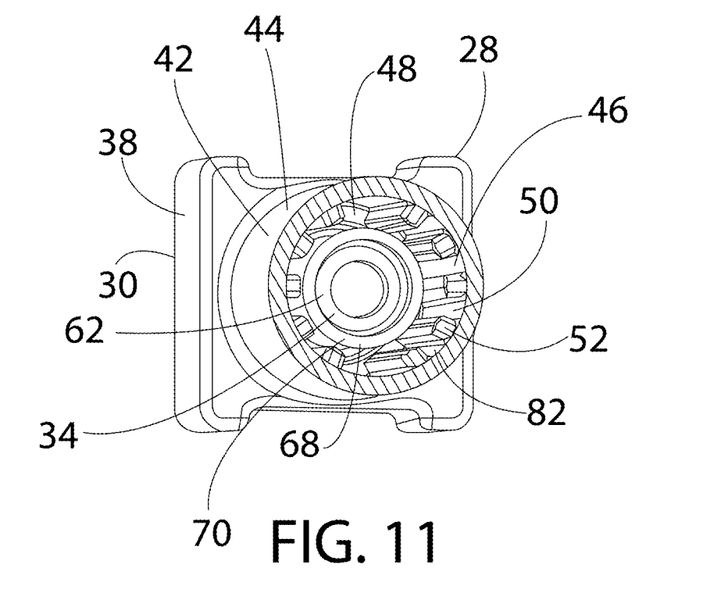
FIG. 11 is a partial cross-section view of the fluid accessory taken along line 11-11 in FIG. 2.

As shown in FIG. 11, a partial perspective view taken along line 11-11 of FIG. 2 illustrates the interior of the body 28 as viewed from the distal end 46 of the medial portion 42. Additionally, the inlet adapter 34 and the sleeve 68 are shown inserted therein. It is to be appreciated that the inner diameter of the tubular member 70 of the sleeve 68 is only slightly larger than the outer diameter of the sleeve receiver 62 and the cap 66. Thus, the inlet adapter 34 is inserted through the tubular member 70 of the sleeve 68. Similarly, the outer diameter of the shoulder 48 of the inlet portion 38 is slightly less than the inner diameter of the proximal end 44 of the medial portion 42, as well as the distance between diametrically opposed protrusions 52. As a result, the sleeve 68 may be fitted within the medial portion 42.

Once the sleeve 68 is inserted into the medial portion 42, a plurality of debris collection channels 82 is defined between the inner surface 50 of the medial portion 42, the outer surface of the tubular member 70 of the sleeve 68, the shoulder 48, and each pair of adjacent protrusions 52. As discussed in more detail below, foreign particles or debris contained within the fluid 16 is redirected backward upon flowing out of the sleeve 68 and settles into any one of the debris collection channels 82. This prevents debris from obstructing flow through the remaining components of the fluid accessory 20 and onto any surfaces, such as the windshield 12, cameras, sensors, or the like, which is to be washed by the fluid 16. It is to be understood that when the sleeve 68 is not employed, the debris collection channels 82 are defined by the adjacent protrusions 52 and the sleeve receiver 62 itself.

Figure 12:
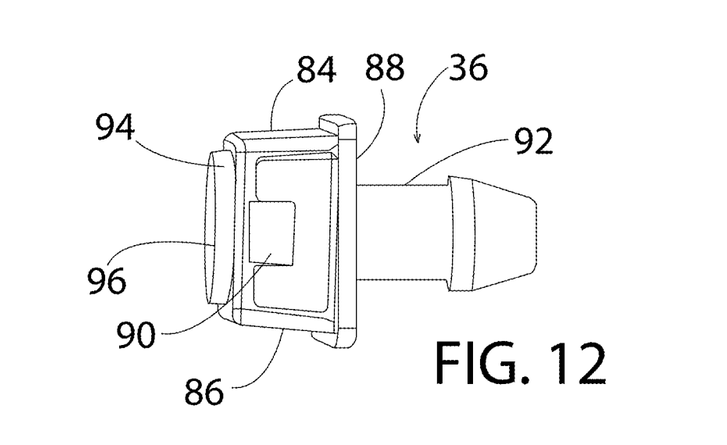
FIG. 12 is a perspective view of an outlet adapter in accordance with the disclosed inventive concept.

The outlet adapter 36 is shown in more detail apart from the body 28 in FIG. 12. Similar to the inlet adapter 34, the outlet adapter 36 includes an outlet frame 84 having inwardly-tapered edges 86 which fit within the outlet portion 40 of the body 28. It is to be understood that the inner walls of the outlet portion 40 are also tapered to accommodate the outlet frame 84. The outlet frame 84 also includes an outlet stop plate 88, which prevents the outlet frame 84 from extending too far into the body 28. Additionally, the outlet frame 84 includes a pair of outlet flanges 90 (only one is shown) protruding from opposite sides of the outlet frame 84. Each outlet flange 90 extends through a respective one of the openings 41a and 41b formed in the outlet portion 40 of the body 28, thereby locking the outlet adapter 36 within the outlet portion 40 when inserted therein.

An outlet barb 92 and a lip 94 extend from the outlet frame 84 at opposite ends thereof. An outlet fluid passageway 96 extends entirely through the outlet adapter 36 from the lip 94 to an end of the outlet barb 92. Thus, once the outlet barb 92 is inserted into an end of the second fluid hose 24 (FIG. 1), fluid 16 is permitted to flow through the outlet fluid passageway 96 of the outlet adapter 36 and exit the body 28.

Figure 13:
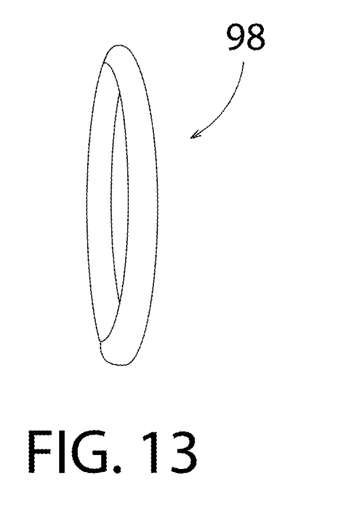
FIG. 13 is a perspective view of an O-ring in accordance with the disclosed inventive concept.

As shown in FIG. 13, a seal, such as an O-ring 98, is shown. The O-ring 98 is fitted around the outer circumference of the lip 94 on the outlet adapter 36. Thus, a fluid tight seal is created between the outlet adapter 36 and the body 28 when inserted therein. As shown, the O-ring 98 is a circular member. However, it is to be understood that the shape of the O-ring 98 is not limited to the geometry illustrated herein and may be formed to fit the lip 94 no matter the shape. For example, both the lip 94 and the O-ring 98 may have a square cross-sectional shape.

Figure 14:
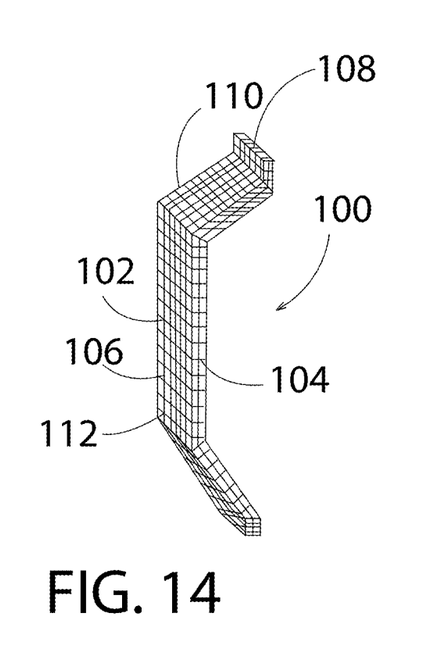
FIG. 14 is a partial perspective view of a filter media in accordance with the disclosed inventive concept.

A filter media 100 is shown in FIG. 14. As shown, the filter media 100 has an inlet side 102 and an outlet side 104. Preferably, the filter media 100 is a mesh screen formed from any suitable material, such as stainless steel, nylon, polyester, or the like. Regardless of the material chosen, the filter media 100 includes a plurality of filter holes 106 that permit the passage of fluid 16. The filter holes 106 are large enough to allow the fluid 16 to pass through, but prevent the passage of foreign particles or debris. Thus, the size of the filter holes 106 are preferably in the range of about 50 microns to about 500 microns. The size of the filter holes 106 is determined based on the amount, size, and type of debris expected to be found in the fluid 16. More particularly, the filter media 100 is preferably a domed-member having a flange 108, an arm 110 extending angularly therefrom, and a body 112. The filter media 100 is not limited to the geometry illustrated herein. As such, the filter media 100 may also be a planar member without a domed configuration. Additionally, it is to be understood that the filter media 100 may have any cross-sectional shape, such as circular, in order to conform to the body 28.

Figure 15:
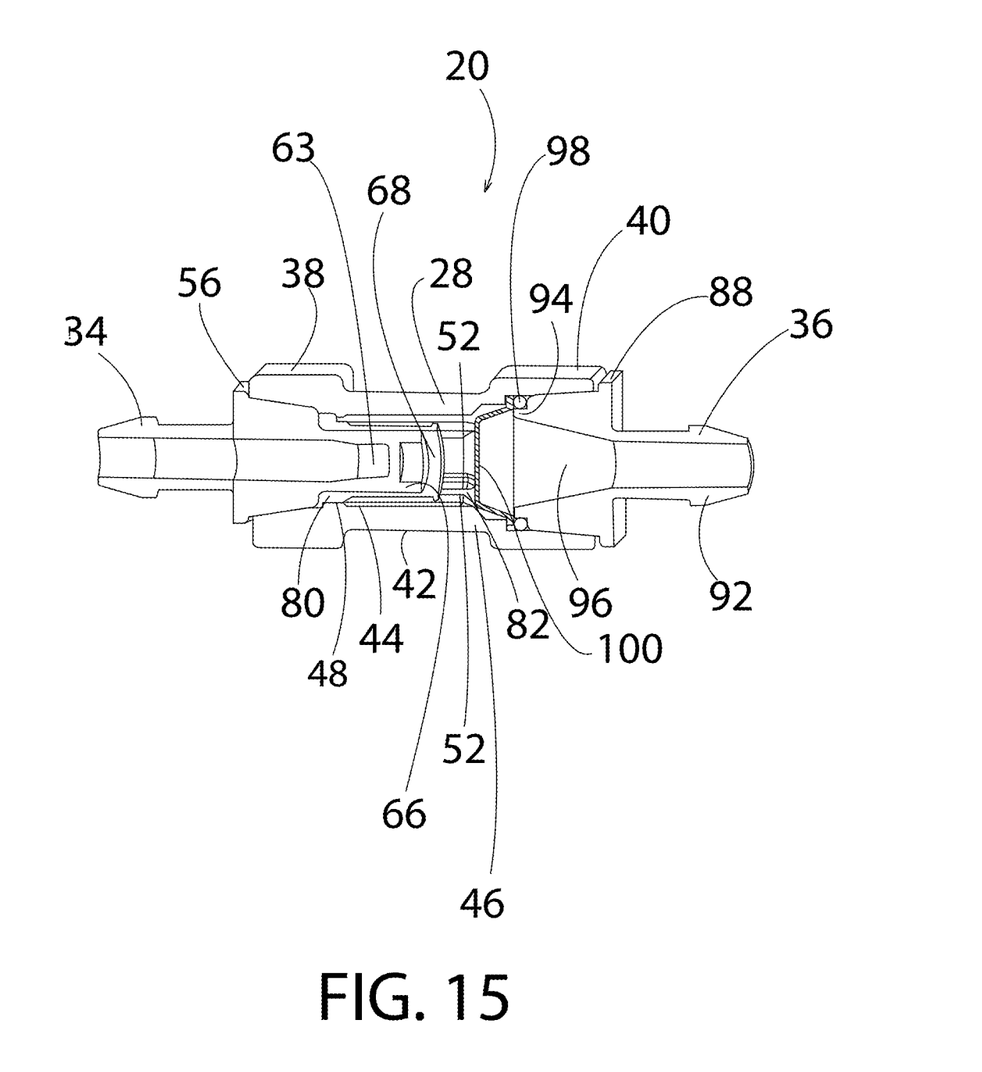
FIG. 15 is a cross-section view of the fluid accessory in accordance with the disclosed inventive concept.

As shown in FIG. 15, a cross-sectional view of the entire assembled fluid accessory 20 is shown. As such, the inlet adapter 34, which includes the cap 66, and the outlet adapter 36 are both shown inserted into the inlet portion 38 and the outlet portion 40, respectively, of the body 28. Prior to inserting the inlet adapter 34 into the inlet portion 38, the sleeve 68 is fitted onto the inlet adapter 34. Thereafter, the inlet adapter 34 and the sleeve 68 are simultaneously inserted into the body 28 until the rim 80 of the sleeve 68 contacts the shoulder 48 of the inlet portion 38 and the inlet stop plate 56 contacts the inlet end 30 of the body 28. Although not shown, it is to be understood that the inlet adapter 34 becomes lockingly engaged with the body 28 as the inlet flanges 58 extend into the openings 39a and 39b formed in the inlet adapter 34. This arrangement defines the debris collection channels 82 between each pair of adjacent protrusions 52.

Prior to inserting the outlet adapter 36 into the outlet portion 40 of the body 28, the filter media 100 is positioned within the outlet portion 40 abutting against the distal end 46 of the medial portion 42. The O-ring 98 is then fitted around the lip 94 of the outlet adapter 36 and the outlet adapter 36 is inserted into the outlet portion 40 until the lip 94 contacts the filter media 100 and the outlet stop plate 88 contacts the outlet end 32 of the body 28. Although not shown, it is to be understood that the outlet adapter 36 becomes lockingly engaged with the body 28 at this point as the outlet flanges 90 extend into the openings 41a and 41b formed in the outlet adapter 36. As shown, the outlet fluid passageway 96 tapers inwardly from the filter media 100 toward the outlet barb 92 to create a pressure differential upon exiting the body 28.

In use, the pump 22 is activated for three to five second intervals in order to pulse on and off, thereby forcing fluid to repeatedly enter the inlet adapter 34. Thereafter, the cap 66 forces the fluid out of the outlet port 63 of the inlet adapter 34 in a perpendicular manner. In doing so, the pressure from the fluid causes the sleeve 68 to expand in order to provide a gap or space between the sleeve 68 and inlet adapter 34 for the fluid to exit through. Once the pump 22 deactivates, the sleeve 68 is allowed to return to its original state providing a fluid seal and check valve around the outlet port 63. The check valve created by the sleeve 68 prevents the backflow of fluid 16 through the inlet adapter 34. Additionally, the inlet fluid passageway 64 of the inlet adapter 34 remains filled with fluid 16. Thus, when the pump 22 is reactivated, fluid 16 begins to flow through the inlet adapter 34 immediately. This greatly reduces the time required to initiate the discharge of fluid 16 from the fluid accessory 20.

It is to be understood that the optimal orientation of the fluid accessory 20 within the vehicle 10 is such that the outlet adapter 36 is at a higher elevation than the inlet adapter 34. During activation of the pump 22, a low fluid flow area relative to the other flow areas is created within the debris collection channels 82. Once the pump 22 is deactivated, gravity causes debris to settle within the debris collection channels 82 instead of being repeatedly forced against the filter media 100.

Figure 16:
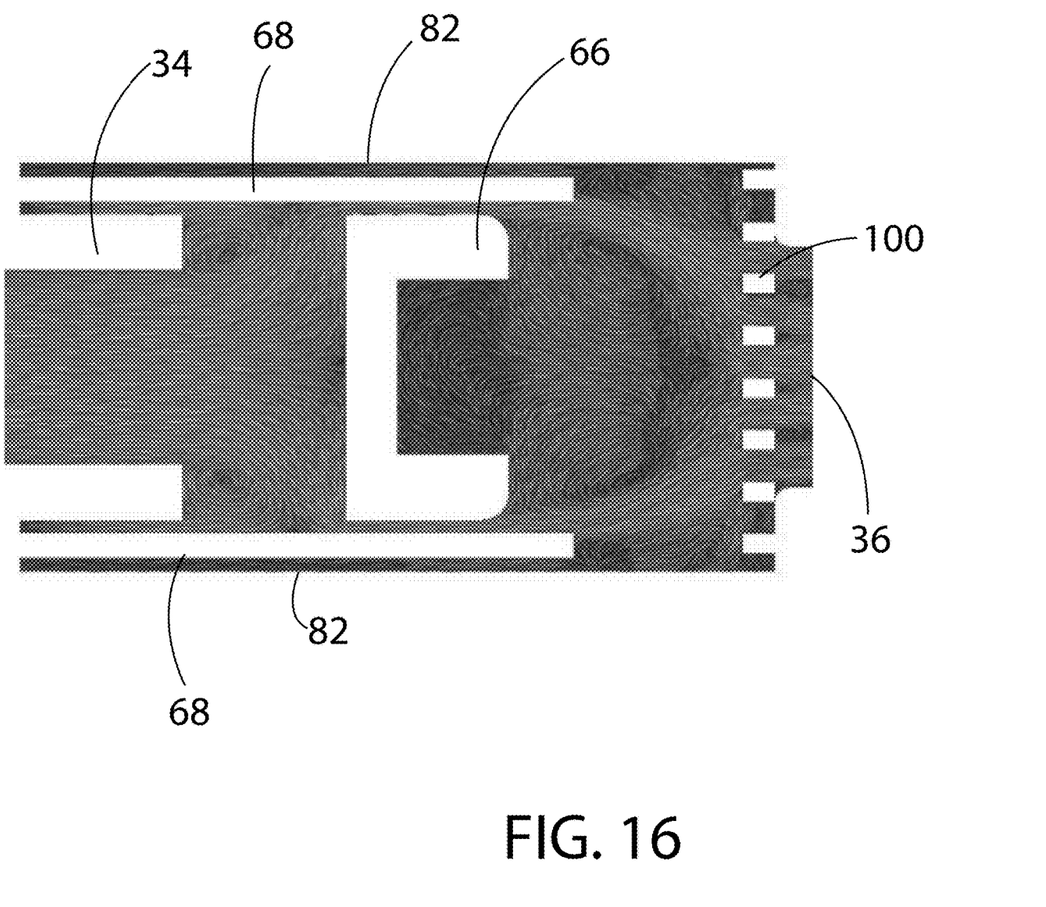
FIG. 16 is a computational fluid dynamics simulation image of fluid flowing through the fluid accessory in accordance with the disclosed inventive concept.

FIG. 16 is an image taken from a computational fluid dynamics simulation of the fluid accessory 20 while in use. In order to illustrate the rate of fluid flow through the fluid accessory 20, all components are white or otherwise not shown while the fluid is shown by fluid lines either being darker or lighter. It is to be understood that the darker-shaded areas represent a low flow of fluid relative to the lighter-shaded areas which represent a higher flow of fluid. As a result of the inlet adapter 34 including the cap 66 providing a check valve function, debris entering the low flow areas near the debris collection channels 82 settles therein once the pump 22 deactivates.

It is to be understood that in the low flow areas, namely, the debris collection channels 82 and within the cap 66, the velocity of the fluid is nearly 0 m/s (meters per second). Alternatively, in the areas in which the fluid has a high rate of flow, such as within the gap formed between the inlet adapter 34 and the sleeve 68, the rate of fluid flow ranges from about 20 m/s to about 30 m/s. These values are used for exemplary purposes only and the disclosed inventive concept is not limited to the flow rates described herein. What is critical to the disclosed inventive concept is that the rate of fluid flow along the exterior of the inlet adapter 34 is substantially less than the rate of fluid flow at the filter media 100 and the outlet adapter 36.

From the above, it is to be appreciated that defined herein is a new and unique fluid accessory for use in a fluid washer system. More particularly defined herein is a new and unique fluid accessory that provides means for collecting debris within the fluid prior to being dispersed onto a vehicle component be sprayed.

One skilled in the art will readily recognize from such discussion, and from the accompanying drawings and claims, that various changes, modifications, and other variations can be made therein without departing from the spirit and fair scope of the disclosed inventive concept as defined by the following claims.

What is claimed is:

1. A fluid accessory for a vehicle, comprising:
a body having an inlet end and an outlet end, said body has an inner surface, said body including a plurality of longitudinal protrusions extending radially into said body along said inner surface between said inlet end and said outlet end;
an inlet adapter positioned within said inlet end of said body; and
a filter media positioned within said body,
wherein said plurality of longitudinal protrusions cooperates with said inlet adapter to define a plurality of debris collection channels.

2. The fluid accessory of claim 1, wherein said inlet adapter includes a sleeve receiver having an outlet port.

3. The fluid accessory of claim 2, wherein said inlet adapter includes a cap attached to said sleeve receiver at said outlet port.

4. The fluid accessory of claim 3, further comprising a sleeve fitted around said outlet port.

5. The fluid accessory of claim 4, wherein said sleeve is elastic, said sleeve cooperating with said inlet adapter to provide a check valve.

6. The fluid accessory of claim 1, wherein said body includes a medial portion, said medial portion having a first diameter, said inlet end having a second diameter being less than said first diameter, said plurality of longitudinal protrusions extending along said medial portion to said inlet end.

7. The fluid accessory of claim 1, further comprising an outlet adapter fitted within said outlet end of said body, said filter media being positionable between said outlet adapter and said body.

8. The fluid accessory of claim 1, wherein said inlet adapter further comprises an inlet flange insertable into said body for locking said inlet adapter therein.

9. A fluid accessory for a vehicle, comprising:
a body having an inlet portion, an outlet portion, and a medial portion having an inner surface, said body including a plurality of longitudinal protrusions formed in said medial portion and extending radially into said body along said inner surface;
an inlet adapter positioned within said inlet portion of said body;
a sleeve positioned within said body and encircling said inlet adapter; and
a filter media positioned within said body.

10. The fluid accessory of claim 9, wherein said plurality of longitudinal protrusions cooperates with said sleeve to define a plurality of debris collection channels.

11. The fluid accessory of claim 9, wherein said medial portion of said body has a first diameter, said inlet portion has a second diameter being less than said first diameter, said plurality of longitudinal protrusions extending along said medial portion to said inlet portion.

12. The fluid accessory of claim 9, further including an outlet adapter positioned within said outlet portion, said inlet portion and said outlet portion each including an opening formed in a side thereof for facilitating locking of said inlet adapter and said outlet adapter within said body.

13. The fluid accessory of claim 12, wherein said outlet adapter includes an outlet frame, an outlet stop plate for preventing over insertion into said body, an outlet barb extending from said outlet frame, a lip formed on said outlet frame opposite said outlet barb, and an outlet fluid passageway extending through said outlet frame and said outlet barb.

14. The fluid accessory of claim 13, wherein said outlet frame has edges that taper inwardly toward said lip.

15. The fluid accessory of claim 13, further comprising an O-ring positionable around said lip for creating a fluid-tight seal between said outlet adapter and said body.

16. The fluid accessory of claim 12, wherein said outlet adapter further comprises an outlet flange insertable through said opening in said outlet portion of said body for locking said outlet adapter therein.

17. A fluid accessory for a vehicle, comprising:
- a body having an inlet end and an outlet end, said body having an inner surface and including a plurality of longitudinal protrusions extending radially into said body along said inner surface between said inlet end and said outlet end;
- an inlet adapter positioned within said body, said inlet adapter configured to supply a fluid into said body and create low flow areas within said longitudinal protrusions;
- a sleeve encircling said inlet adapter; and
- a filter media positioned within said body.

18. The fluid accessory of claim 17, wherein said inlet adapter includes a cap.

19. The fluid accessory of claim 18, wherein said sleeve is elastic, said sleeve cooperating with said inlet adapter to provide a check valve.

20. The fluid accessory of claim 19, wherein said sleeve is formed from silicone.

* * * * *